United States Patent [19]

Blakkan

[11] Patent Number: 5,067,132
[45] Date of Patent: Nov. 19, 1991

[54] ONE OUT OF N CHECKING APPARATUS AND METHOD

[75] Inventor: John A. Blakkan, Santa Clara, Calif.

[73] Assignee: Tandem Computers Incorporated, Cupertino, Calif.

[21] Appl. No.: 353,717

[22] Filed: May 18, 1989

[51] Int. Cl.⁵ ............................................. H03M 13/02
[52] U.S. Cl. ................................................... 371/52
[58] Field of Search ......................... 371/52, 57.1, 21.1

[56] References Cited

U.S. PATENT DOCUMENTS

| | | | |
|---|---|---|---|
| 3,428,945 | 2/1969 | Toy | 371/52 |
| 3,744,024 | 7/1973 | Russell et al. | 340/146.1 AB |
| 4,087,786 | 5/1978 | Lescinsky et al. | 371/52 |
| 4,498,177 | 2/1985 | Larson | 371/52 |
| 4,873,686 | 10/1989 | Tada et al. | 371/21.1 |

Primary Examiner—Jerry Smith
Assistant Examiner—Phung My Chung
Attorney, Agent, or Firm—Townsend and Townsend

[57] ABSTRACT

A one out of N checking circuit for determining whether exactly one of N signal lines is active at any given time. The circuit includes a hierarchal structure of nodes which pairs the N signal lines together in a series of steps. Each node includes a par of output signal lines. The first signal line carries a signal representing whether an active signal line was "seen." The second signal line carries a signal representing whether an error has occurred, i.e. multiple active lines were seen. After each step, the number of signal lines is reduced by one-half until only two signal lines remain. At that point the two signal lines are compared and a final error signal is transmitted.

13 Claims, 6 Drawing Sheets

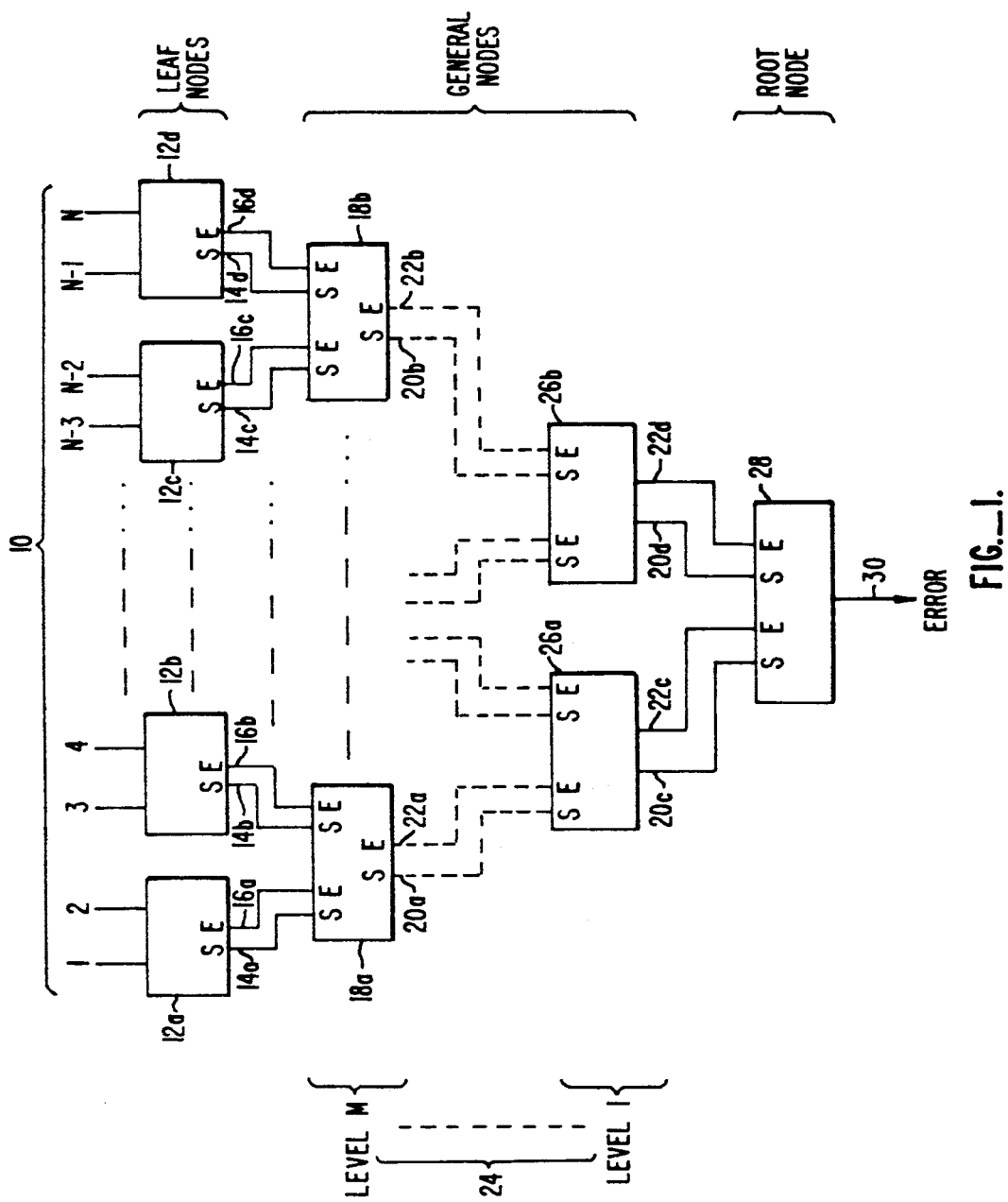
FIG._1.

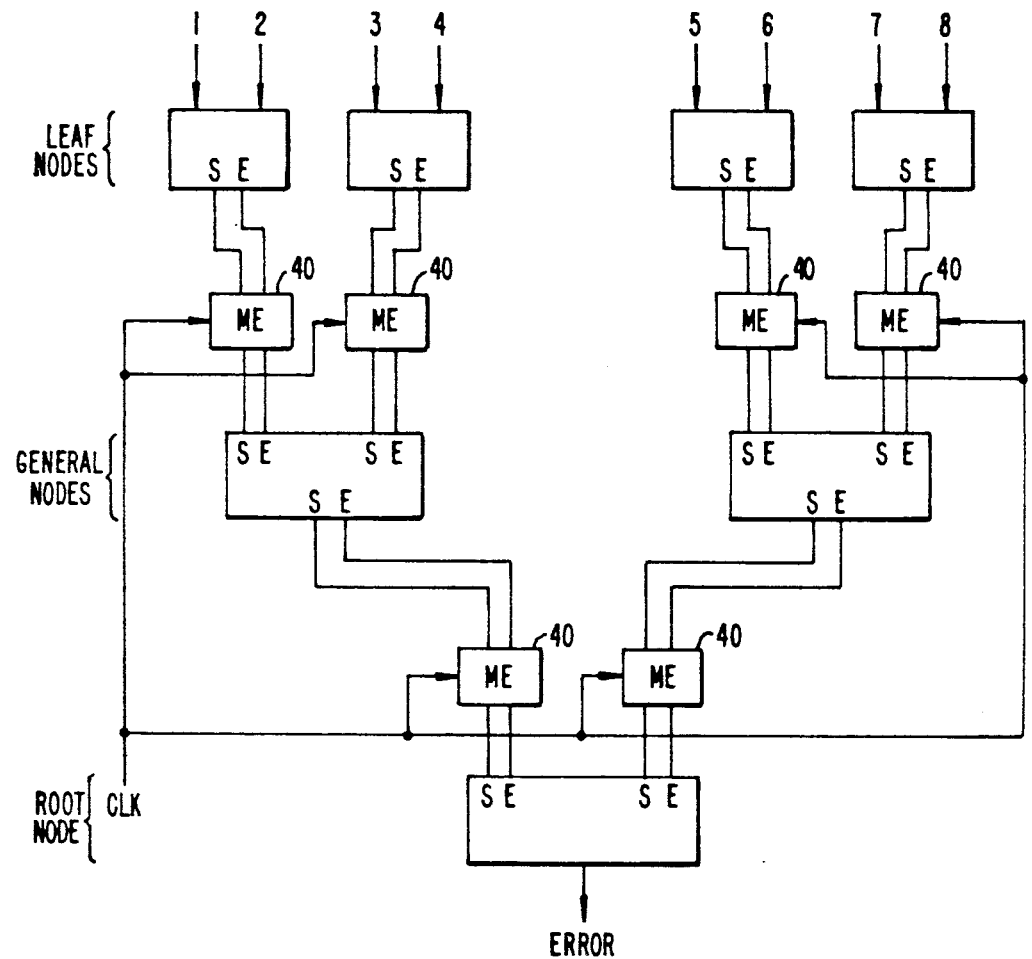
FIG._2.

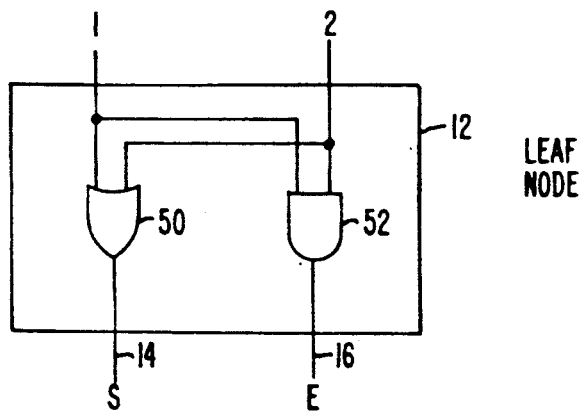
FIG._3A.
LEAF NODE
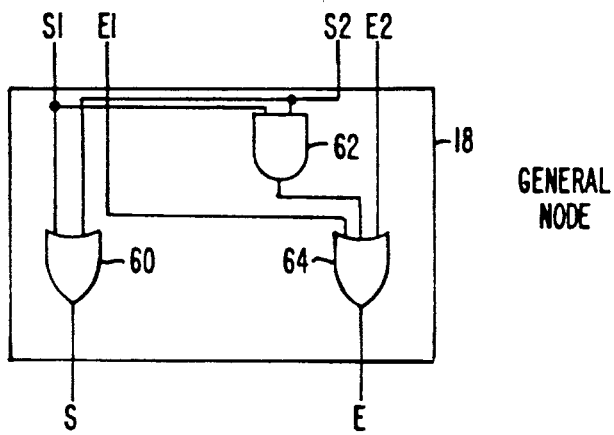
FIG._3B.
GENERAL NODE
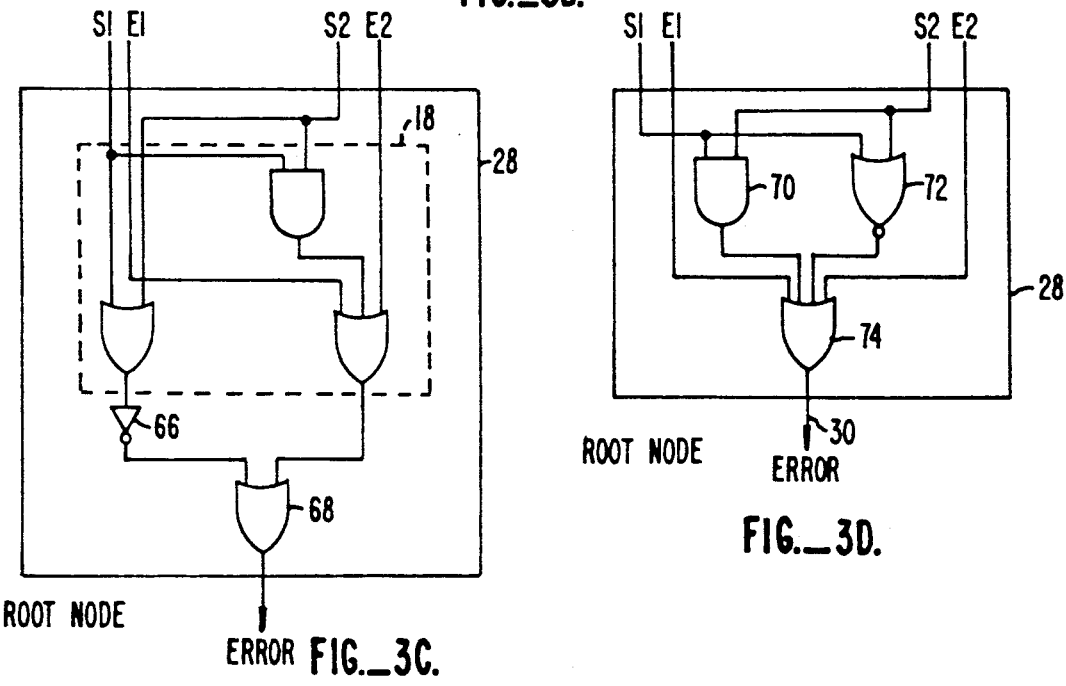
ROOT NODE
ERROR FIG._3C.
ROOT NODE
FIG._3D.

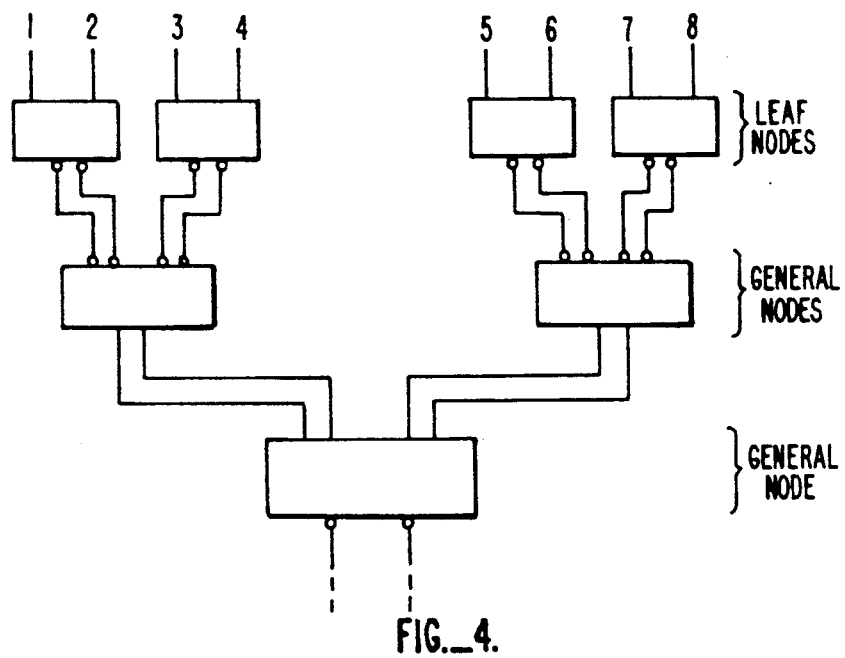
FIG._4.
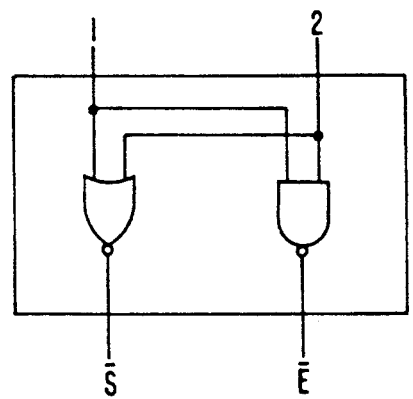
FIG._5A.
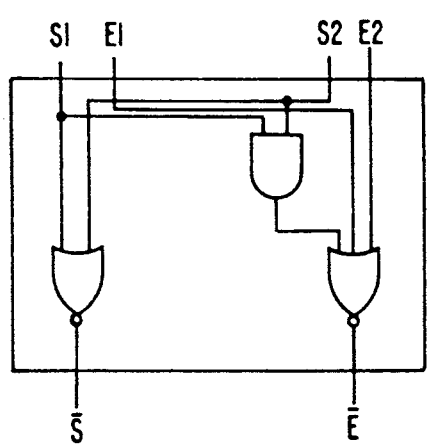
FIG._5B.
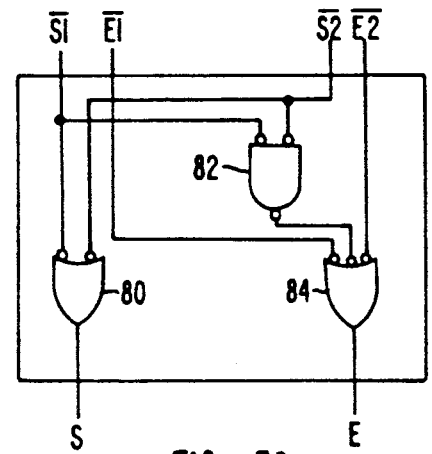
FIG._5C.

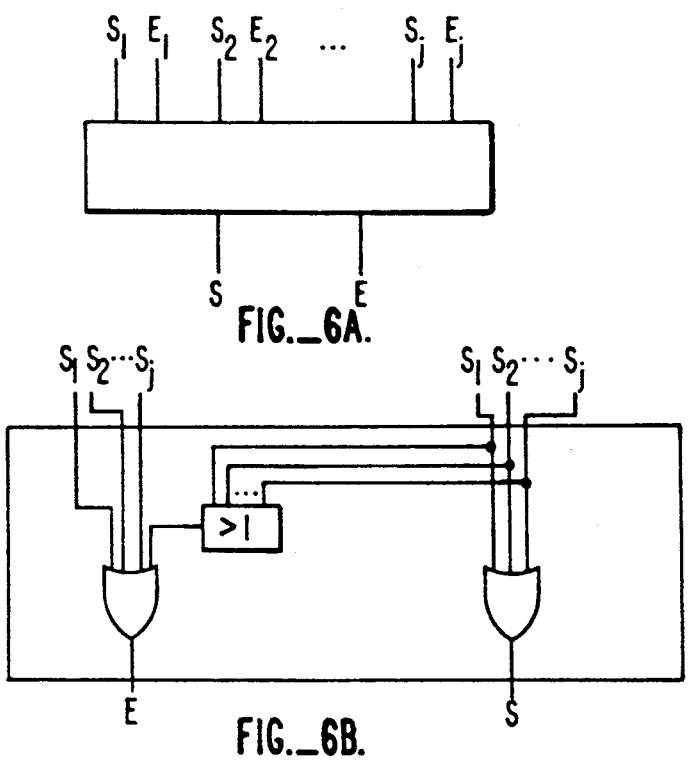
FIG._6A.
FIG._6B.
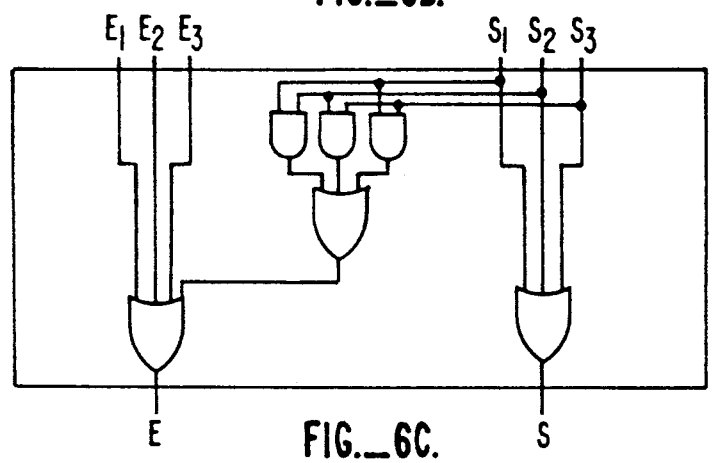
FIG._6C.
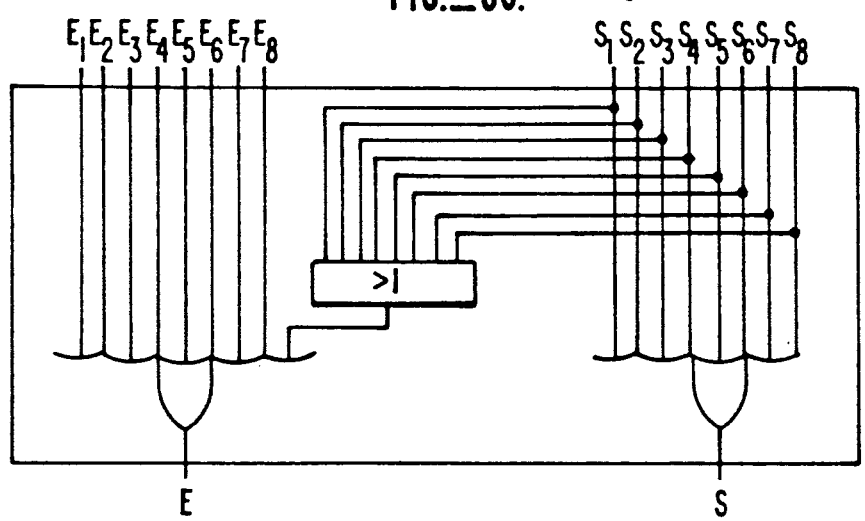
FIG._6D.

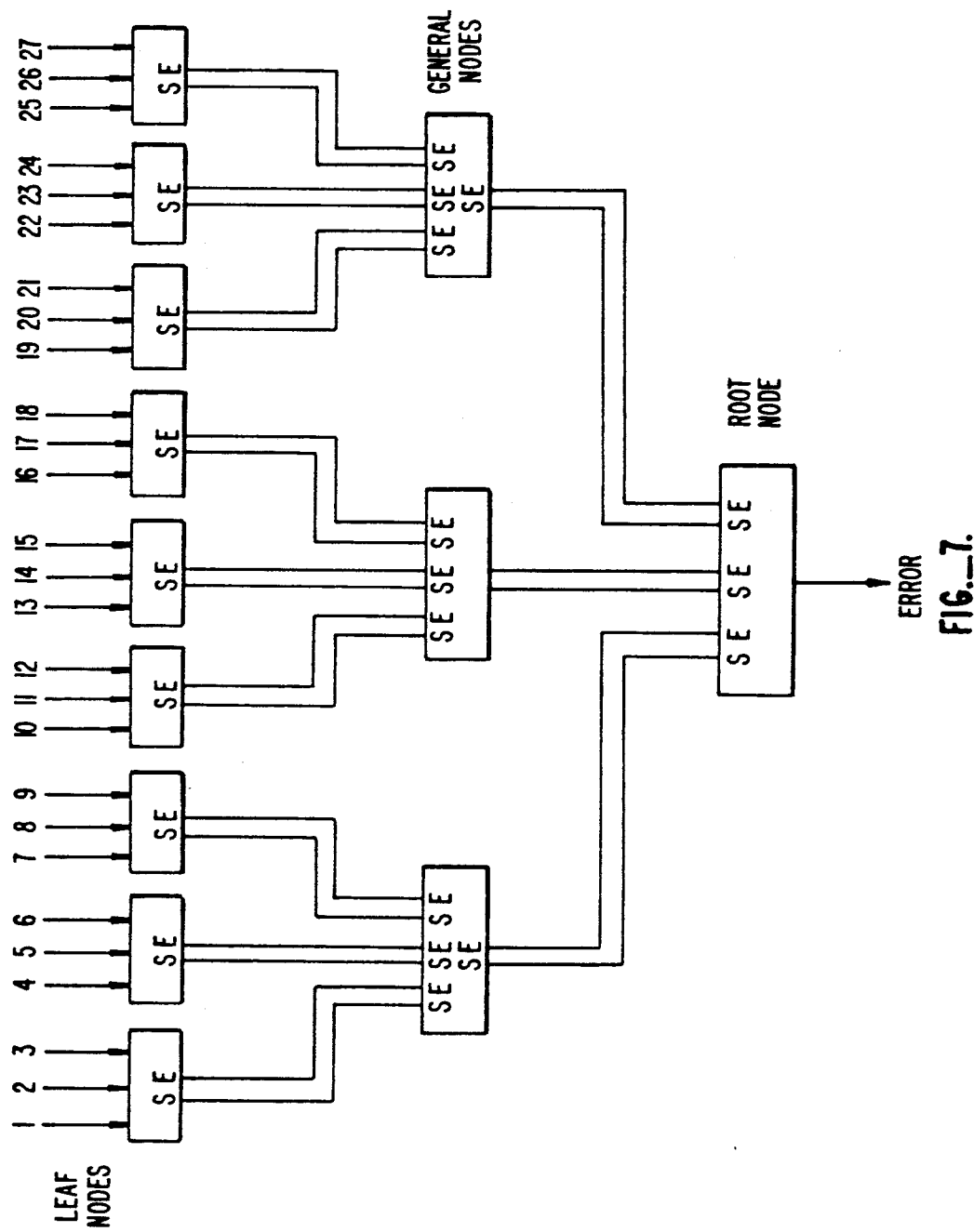
FIG._7.

ONE OUT OF N CHECKING APPARATUS AND METHOD

BACKGROUND OF THE INVENTION

The present invention relates generally to error checking and particularly to determining whether exactly one of N signal lines is active.

Implementation of state machines with one memory element per state design is often desirable. Typically, such a state machine will always have exactly one memory element set during proper operation. An error in the system can cause either more than one or none of the N memory elements to be set. When such an error occurs, data can be misdirected and errors can be propagated throughout the system. Therefore, it is beneficial to test state machines of this type to determine whether exactly one of the signal lines is active.

A number of error detection techniques have been designed for checking whether exactly one out of N signal lines is active. For example, U.S. Pat. No. 4,020,460 (hereinafter 460) teaches a complementation technique which requires redundant hardware for providing complemented signals of the signals on the N signal lines. However, most of the previous techniques, like 460, require a substantial amount of hardware, and can be slow thereby causing delays in the system.

SUMMARY OF THE INVENTION

The present invention provides a one out of N checking apparatus and method characterized by a minimal amount of hardware and circuit delay. The checking apparatus is designed in a tree configuration. The N signal lines are paired and input into a set of leaf nodes, with any left-over signal lines being paired with an inactive signal line. The output of each leaf node consists of two signals a "seen" signal and an "error" signal. The seen signal is active if and only if at least one of the paired signal lines is active. The error signal is active if and only if both of the paired inputs are active.

The branch section of the tree configuration consists of a set of general nodes of M levels (M is a whole number). Each general node includes two "seen-error" (S-E) pair inputs each receiving either one S-E pair from a S-E pair leaf output, a S-E pair from a higher level S-E pair general output (see below). or an inactive pair. The general node output consists of a single S-E pair which includes a "seen" component and an "error" component. The "seen" component is active if and only if at least one of the S inputs is active. The "error" component is active if and only if one or more of the E components is active or both S inputs are active.

The outputs of the general nodes are paired and input to another level of general nodes until a level is reached containing two general nodes. At that point the outputs of the two general nodes are input to the root node of the tree. The root node includes two S-E pair inputs for receiving the S-E pair outputs of the two lowest level general nodes. The root node output indicates whether exactly one of the N signal lines is active. If both S inputs of the root node are active, both S inputs of the root node are inactive, or at least one of the E inputs of the root node is active, an error is indicated.

The present invention has numerous advantages over the prior art. One of these advantages is the simple pyramid structure design. This design provides for easy expansion to include additional signal lines. These signal lines may be added with minimal effort and without a change to the basic design of the circuit. Another advantage of the present invention is that it exhibits minimal propagation delay as a signal is transmitted though the circuit. This feature allows the present invention to be implemented in situations where timing is critical. Moreover, the present invention can be implemented in a pipeline structure.

For a further understanding of the nature and advantages of the present invention, reference should be made to the remaining portion of the specification and the attached drawings.

BRIEF DESCRIPTION OF THE DRAWINGS

FIG. 1 is a block diagram of a one out of N checking circuit in a preferred embodiment of the present invention:

FIG. 2 is a block diagram of a one out of N checking circuit including memory elements between the nodes;

FIGS. 3A-3D are circuit diagrams of the different nodes of a one out of N checking circuit;

FIG. 4 is an alternative block diagram of a one out of N checking circuit using inverting gates;

FIGS. 5A-5C are circuit diagrams of the different nodes of the alternative embodiment of the one out of N checking circuit shown in FIG. 4:

FIGS. 6A-6D show alternative block diagrams of a one out of N checking circuit using an implementation with j number of inputs to each node; and FIG. 7 is a block diagram of a one out of N checking circuit in an alternative embodiment of the present invention.

DESCRIPTION OF THE PREFERRED EMBODIMENT

In general to those skilled in the art to which this invention relates, many changes in construction and widely differing embodiments and applications of the present invention will suggest themselves without departing from its spirit and scope. Thus, the disclosures and descriptions herein are purely illustrative and are not intended to be in any sense limiting.

FIG. 1 is a block diagram of a one out of N checking circuit according to the present invention. N signal lines 10 are input to a group of leaf nodes 12a-d. Each leaf node 12a-d has two inputs for receiving at least one of N signal lines 10. For example, leaf node 12a receives on its two input signal lines 1 and 2. The second input of a leaf node may be connected to an inactive signal line in the case where an odd number of N signal lines exists (not shown).

Each leaf node 12a-d has a "seen" (S) output 14a-d and an "error" (E) output 16a-d. S output 14 is active when at least one of the input signals is active. E output 16 is active when more than one of the input signals is active.

A plurality of general nodes are arranged in a hierarchal structure containing M levels. A top level of general nodes 18a-b. each general node containing four inputs, are arranged below leaf nodes 12a-d. The four inputs of each general node 18a-b are configured to receive two S-E pairs 14. 16. For example general node 18a receives S-E pair 14a, 14b, 16a, 16b from leaf nodes 12a, 12b. In the case of a "leftover" general node input pair, the inputs are set to be inactive (not shown). General nodes 18a-b each have a S-E pair output 20. 22 similar to that of leaf nodes 12a-d. The S component 20 is active if at least one of the S inputs is active. The E component 22 is active if at least one of the E inputs is active or if both S inputs are active.

Following the top level of general nodes 18a-b are (M-1) lower levels of general nodes 24. The number M is dependent upon the number of signal lines which are to be checked. The number of general nodes in each succeeding level is reduced until at the lowest level (level 1) there are two general nodes 26a-b.

The S-E pair outputs 20, 22 of the two lowest level general nodes 26a-b are input to a root node 28. Root node 28 issues a final error signal on error signal line 30. The error signal is active if both S inputs are inactive. both S inputs are active or at least one of the E inputs is active.

FIG. 2 is an alternative embodiment of the present invention implementing memory elements 40 between the various level of nodes. Memory elements are used to store a signal propagated through the circuit to ensure that if a delay occurs, the signal is not lost before it gets to the next stage of nodes.

FIGS. 3A-3D are circuit diagrams of the different nodes shown in FIG. 1. FIG. 3A represents leaf node 12. An OR gate 50 has inputs connected to two of the N signal lines 10. An AND gate 52 has its inputs connected to the same two of the N signal lines 10. The output of OR gate 50 is S output 14 of leaf node 12. The output of AND gate 52 is E output 16 of leaf node 12.

FIG. 3B represents a general node 18. An OR gate 60 receives the S outputs 14 of two previous nodes. An AND gate 62 also receives the S outputs 14 of two previous nodes. A second OR gate 64 having three inputs receives the E outputs 16 of two previous nodes as well as the output of AND gate 62. The output of OR gate 60 is the S output 20 of general node 18. The output of OR gate 64 is the E output 22 of general node 18.

FIG. 3C represents a root node 28. A first embodiment of root node 28 is shown in FIG. 3C. In this embodiment a general node 18 like that shown in FIG. 3B is used. However, the S output is fed through an inverter 66 and then both the E output and the inverted S output are input to an OR gate 68. The output of OR gate 68 is the error signal.

An alternative embodiment is shown in FIG. 3D. An AND gate 70 has inputs connected to the S outputs 20 of the lowest level general nodes 26. A NOR gate 72 has inputs also connected to the S outputs 20 of the lowest level general nodes 26. A four input OR gate 74 has two inputs connected to the E outputs 22 of the lowest level general nodes 26. In addition. OR gate 74 receives the outputs of AND gate 70 and NOR gate 72. When exactly one of the N input lines is active, the output of OR gate 74 is inactive. When zero or more than one of the N input lines are active the output of OR gate 74 is active, indicating an error.

FIG. 4 is an alternative embodiment of the present invention implemented using inversion functions. These inversion functions may be used to increase speed in some circumstances. The circuit shown in FIG. 4 works in the same manner as that in FIG. 1.

FIGS. 5A-5C represent the different nodes shown in FIG. 4. FIG. 5A shows the leaf node which is the same as FIG. 3A except that the output signals are inverted. FIGS. 5B and 5C represent the general nodes for the alternative implementation. FIG. 5B represents a general node in the second level of general nodes below the leaf nodes and is the same as the general node of FIG. 3B except that the output, signals are inverted. As can be seen from FIG. 4 each one of the leaf nodes has inverters on its outputs. Therefore, the first level of general nodes must have a different design. That design is shown in FIG. 5C. An OR gate 80 with inverters on the inputs and a NAND gate 82 with inverters on its inputs receive the inverted S outputs of the leaf nodes such as that shown in FIG. 5A. A second three input OR gate 84 with inverters on its inputs receives the two inverted E outputs of the lowest leaf nodes such as that shown in FIG. 5A as well as the output of NAND gate 82. The levels of general nodes in the circuit alternate between the two types of general nodes.

There is no figure showing the root node of the alternative embodiment form shown in FIG. 4. The root node for this alternative embodiment can be in one of two forms. If the lowest level general nodes are of the type shown in FIG. 5C, then an ordinary root node like that shown in FIG. 3C can be used. If the lowest level general nodes are of the type shown in FIG. 5B. then an ordinary root node with an inverter on each of the four input signal lines can be used.

FIGS. 6A-6D show alternative embodiments of the invention generalized to implement j number of inputs to a single node (FIGS. 6A and 6B). FIGS. 6C and 6D are diagrams showing three and eight inputs respectively.

FIG. 7 is an alternative embodiment of the present invention using the node shown in FIG. 6C. In this case N equals 27 and j equals 3. Nine leaf nodes, three general nodes. and one root node are used. Each leaf node has three inputs; each general node has three S-E pair inputs; and the root node has three S-E pair inputs. In addition, each node has one S-E pair output except the root node which has a single error output.

The operation of the circuit will now be explained with respect to FIGS. 1 and 3A-3D. N signal lines 10 are input to the circuit. These signal lines are paired and input to a leaf node 12. For example, signal lines 1 and 2 are input to leaf node 12a. Within leaf node 12, each pair is input to an AND gate 50 and an OR gate 52 to produce a pair of output signal lines labeled S 14 and E 16 (FIG. 3A). S output 14 is active when at least one of the inputs is active. E output 16 is active when both inputs are active.

The outputs of leaf nodes 12 are paired and input to a level of general nodes 18. Each general node 18. 26 has four inputs to receive a pair of S-E pairs. General nodes 18. 26 contain two OR gates 60, 64 and an AND gate 62 (FIG. 3B). The inputs of OR gate 60 are connected to two S outputs 14 of two leaf nodes 12 in the case of general node level M and two S outputs 20 in the case of general node level 1. The inputs of AND gate 62 are connected to the same two S outputs 14 or 20 of two nodes 12 or 18 respectively. Finally, the three inputs of OR gate 64 are connected to two E outputs 16 or 22 of two nodes 12 or 18 respectively and the output of AND gate 62. The node function's such that when at least one of the S inputs 14, 20 is active, the S component output 20 is active and when both S inputs 14, 20 are active or at least one of the E inputs 16, 22 is active the E component output 22 is active.

Root node 28 has four inputs. The four inputs receive a pair of S-E pairs 20c-d 22c-d from the lowest level of general nodes 26. Once within root node 28, S outputs 20c-d are input to both AND gate 70 and NOR gate 72 (FIG. 3D). The outputs of AND gate 70, NOR gate 72 as well as the E outputs 22c-d of level 1 general nodes 22c-d, are input to four-input OR gate 74. The output 30 of OR gate 74 carries the error signal for the circuit.

The present invention accomplishes one out of N checking in a simple and efficient manner. The design allows for easy expansion with minimal effort and without change to the structure of the circuit. In addition, minimal circuit delay is achieved permitting use of the circuit when timing is critical.

What is claimed is:

1. A method for checking N signal lines to determine whether exactly one of the N signal lines is active, comprising the steps of:
   (a) pairing the N signal lines into a plurality of pairs wherein each of the N signal lines is paired with another one of the N signal lines or an inactive signal line;
   (b) comparing input signals present on the two signal lines in each pair to produce a seen-error (S-E) pair leaf resulting signal, each S-E pair leaf resulting signal including:
      (i) a seen component having two states, an inactive state signifying both input signals are inactive and an active state signifying at least one of the input signals is active; and
      (ii) an error component having two states, an inactive state signifying no more than one of the input signals is active and an active state signifying more than one of the input signals is active;
   (c) further pairing each S-E pair leaf resulting signal with another S-E pair leaf resulting signal;
   (d) comparing the S components of each pair and the E components of each pair and producing an S-E pair general resulting signal including:
      (i) a seen component having two states, an inactive state signifying both seen component inputs are inactive and an active state signifying at least one of the seen component inputs is active; and
      (ii) an error component having two states, an inactive state signifying neither of the error component inputs is active and that no more than one of the seen component inputs is active and an active state signifying one or more of the error component inputs is active or that both seen component inputs are active;
   (e) further reducing the number of signal lines by repeating steps (c) and (d) until one pair of S-E pair general resulting signals remains; and
   (f) comparing the S components of each pair and the E components of each pair and producing a single final error signal which is active if (i) both remaining S component inputs are active, (ii) both remaining S component inputs are inactive, or (iii) either of the remaining E component inputs is active.

2. An apparatus for checking N signal lines to determine whether exactly one of the N signal lines is active, comprising:
   a plurality of leaf nodes, each leaf node including:
      two leaf inputs, at least one of which is coupled to one of the N signal lines and any unused leaf input signal line is set to be inactive; and
      a seen-error (S-E) pair leaf output wherein the seen component is active when at least one of the leaf inputs is active and the error component is active when both inputs are active;
   a plurality of general nodes configured in a hierarchy of M levels such that M is a whole number, each general node including:
      two S-E pair general inputs for receiving at least one S-E pair from one of either (i) an S-E pair leaf output or (ii) an SE pair general output; and
      a single S-E pair general output including:
         a seen component which is active if at least one of the S inputs is active; and
         an error component which is active if (i) one or more of the E inputs is active or (ii) both S inputs are active; and
   a root node including:
      two S-E pair root inputs for receiving two S-E pair general outputs from the M level of the general nodes; and
      a root error output for outputting an error signal when (i) the seen components of both of the M level general node outputs are active, (ii) the seen components of both of the M level general node outputs are inactive, or (iii) at least one of the error components of the M level general note outputs is active.

3. The apparatus of claim 2 further comprising a plurality of memory elements connected between the leaf nodes and the general nodes, between each level of general nodes, and between the N level of general nodes and the root node, the memory elements capable of storing a signal and passing it to the next level of nodes such that the signal is not written over by a succeeding signal.

4. The apparatus of claim 2 wherein each of said leaf nodes includes means for generating an OR function of the two leaf inputs as the seen component and means for generating an AND function of the two leaf inputs as the error component.

5. The apparatus of claim 2 wherein each of said general nodes includes means for generating an OR function of the seen components inputs thereto as the seen output component thereof, means for generating an AND function of the seen components input thereto, and means for generating an OR function of the output of the AND function generating means and the error components input thereto as the error output component thereof.

6. The apparatus of claim 2 wherein said root node includes means for generating an inverse of an OR function of the seen components input thereto, means for generating an AND function of the seen components input thereto, means for generating an OR function of the output of the AND function generating means and the error components input thereto, and means for generating an OR function of the inverse generating means and the OR function generating means as the output error signal.

7. The apparatus of claim 2 wherein said root node includes means for generating an inverse of an OR function of the seen components input thereto, means for generating an AND function of the seen components input thereto, and means for generating the OR function of the output of the AND function generating means, the output of the OR function inverse generating means and the error components input thereto as the output error signal.

8. The apparatus of claim 2 wherein each of said leaf nodes includes means for generating a NOR function of the two leaf inputs as the seen components, and means for generating a NAND function of the two leaf inputs as the error component.

9. The apparatus of claim 2 wherein alternate ones of said general nodes in said hierarchy include means for generating a NOR function of the seen components input thereto as the seen output component thereof, means for generating an AND function of the seen components input thereto, and means for generating a NOR function of the output of the AND function generating mean and the error components input thereto as the error output component thereof.

10. The apparatus of claim 2 wherein alternate ones of said general nodes in said heirarchy means for generating an OR function of inverses of the seen components input thereto as the seen output component thereof, means for generating a NAND function of inverse of the seen components input thereto, and means for generating an OR function of the output of the NAND function generating means and inverses of the error components input thereto as the error output component thereof.

11. An apparatus for checking N lines to determine whether exactly one of the N lines is active, comprising:
   a plurality of leaf nodes, each leaf node including,
      J leaf inputs, where J is an integer greater than two, at least one of the J leaf inputs is coupled to one of the N lines and any unused leaf input line is set to be inactive.
   a seen-error (S-E) pair leaf output wherein the seen component is active when at least one of the leaf inputs is active and the error component is active when more than one input is active;
   a plurality of general nodes configured in a hierarchy of M levels such that M is a whole number, each general node including,
      J S-E pair general inputs for receiving at least one S-E pair from one of either (i) an S-E pair leaf output or (ii) an S-E pair general output, and
      a single S-E pair general output including,
         a seen component which is active if at least one of the S inputs is active, and
         an error component which is active if (i) at least one of the E inputs is active or (ii) more than one S input is active; and
   a root node including,
      J S-E pair root inputs for receiving J S-E pair general outputs from the M level of general nodes, and
      a root error output for outputting an error signal when (i) the seen components of at least one of the M level general node outputs is active, (ii) the seen components of all of the M level general node outputs are inactive, or (iii) at least one of the error components of the M level general node outputs is active.

12. The apparatus of claim 11 wherein each of said leaf nodes includes means for generating an OR function of the J leaf inputs as the seen component, and means for generating an AND function of the J leaf puts taken two at a time as the error component.

13. The apparatus of claim 11 wherein each of said general nodes includes means for generating an OR function of the J seen components input thereto as the seen output component thereof, means for generating an AND function of the J seen components input thereto taken two at time, and means for generating an OR function of the error components input thereto and the output of the AND function generating means as the error output component thereof.

* * * * *